UNITED STATES PATENT OFFICE.

JOHN P. KELLY AND HAROLD F. REID, OF GRANTWOOD, NEW JERSEY.

COMPOSITION FOR REMOVING PAINT AND VARNISH.

1,219,559.     Specification of Letters Patent.     Patented Mar. 20, 1917.

No Drawing.     Application filed February 18, 1916. Serial No. 79,109.

*To all whom it may concern:*

Be it known that we, JOHN P. KELLY and HAROLD F. REID, citizens of the United States, and residents of Grantwood, county of Bergen, State of New Jersey, have invented an Improvement in Compositions for Removing Paint and Varnish, of which the following is a specification.

This invention relates to paint and varnish removers and more particularly to a composition for removing paint and varnish and the process of making the same. It is an object of this invention to produce a remover for paints and varnishes having an inorganic base, and which, in addition to being non-poisonous and free from the emission of injurious vapors, is also non-explosive and incombustible.

Paint or varnish removers as heretofore devised have been open to the objection that the ingredients are highly volatile and in consequence evaporation takes place with such rapidity that the composition becomes substantially inactive before the paint or varnish is softened. Furthermore certain removers are not only impracticable in use but decidedly harmful to the workmen engaged in applying the same, due to the injurious fumes and the poisonous effect upon the hands. While we are aware that various attempts have been made to overcome and offset such disadvantages as above outlined, we believe we are the first to devise a composition and process for making the same wherein the foregoing defects are eliminated and at the same time a non-explosive and incombustible remover is obtained.

An illustrative example of a remover embodying our invention may be prepared according to the following formula:—

| Ingredient | Parts |
|---|---|
| Tri-sodium phosphate $12H_2O$ | 18.27 parts |
| Aqua ammonia 26° Baumé | 8.7 " |
| Caustic soda | .9 " |
| Sodium nitrate | 4.35 " |
| Peroxid of hydrogen | 4.35 " |
| Flour | 1. " |
| Starch | 1. " |
| Added water | 61.43 " |
| | 100.00 |

It will be noted that in the above formula we have included starch and flour as ingredients, since in the preferred embodiment of the invention they are used as a binder or stiffener and to cause the composition to adhere to vertical surfaces, though we wish it understood that we are not to be restricted or limited to these exact ingredients. In other words, our formula should not be held to strictly to the use of starch or flour, since obviously substitutes such as gelatin, agar-agar or the like might be utilized to carry out the spirit of our invention.

In preparing the remover for use the tri-sodium phosphate, sodium nitrate and caustic soda (sodium hydroxid) are separably dissolved in suitable proportions of water. Thus we preferably dissolve the tri-sodium phosphate in 40 parts of water; the sodium nitrate in 12 parts of water and the caustic soda in 9.43 parts of water. The solution of sodium nitrate is now poured into the solution of tri-sodium phosphate and the sodium hydroxid added, the mixture being stirred meanwhile at a temperature approximating 60° F. The flour and starch are now both added preferably without preliminary treatment of any kind, the mixture being stirred and heated to approximately 212° F. or until the starch and flour granules swell sufficiently to form a smooth paste. While the mixture is still hot it is passed through muslin or other suitable filtering material, so that all lumps or the like are removed.

The smooth filtered pasty solution is then cooled to approximately 180° F. and approximately 9 parts of aqua ammonia added with stirring, the excess above the 8.7 parts specified as preferred in the formula being an allowance which we have found preferable owing to loss by volatilization. When cooled to prevailing room temperature the hydrogen peroxid is added while stirring and the composition is then ready for packing in cans or the like.

In using the remover it is applied with a brush in a similar manner to a coat of thick paint and allowed to remain on the painted or varnished surface until the paint, varnish, shellac or the like has been softened to the wood, iron or other material from which it is being removed. Ordinarily about seven minutes' time is sufficiently long for paint of one or two coats thickness, though it is customary to test the coated surface by scraping to ascertain the condition. When more than two coats are to be removed a proportionately longer time is required and in some instances it may be desirable to make a second application of the remover after the first has been scraped or washed off. The softening action of the remover takes place through the saponification of the oil of paint or varnish by the tri-sodium phosphate and caustic soda while the aqua ammonia acts as a solvent upon the base.

Broadly considered therefore the remover of our invention comprises a composition consisting of tri-sodium phosphate and caustic soda combined with a non-acid solvent and peroxid of hydrogen or the like which counteracts any tendency of the wood to darken under the heating effects of the remover. To this or an equivalent composition we add the stiffening material such as flour and starch in order to obtain the desirable pasty condition whereby the remover will properly adhere to vertical or inclined surfaces and also retard evaporation.

In speaking of the broad consideration of the invention it should be remembered that the ingredients referred to are merely the preferred embodiment and we do not consider ourselves limited in any way to any one of the foregoing chemicals or to the exact proportions stated, since as far as we are aware we are the first to produce a paint or varnish remover of an incombustible nature in which the chemicals employed are non-acid in character, and therefore consider the invention entitled to a wide interpretation.

Having described our invention what we claim as new and desire to secure by Letters Patent is:

1. A composition for removing paint and varnish comprising approximately 18.27 parts tri-sodium phosphate, 8.7 parts aqua ammonia, .9 parts caustic soda, 4.35 parts sodium nitrate, 4.35 parts peroxid of hydrogen, 1 part flour, 1 part starch and 61.43 parts added water.

2. A composition for removing paint and varnish comprising approximately 18.27 parts tri-sodium prosphate, 8.7 parts aqua ammonia, .9 parts caustic soda, a stiffening material, a solution to counteract darkening of the wood by heat and water.

3. A composition for removing paint and varnish comprising approximately 18.27 parts tri-sodium phosphate, 8.7 parts aqua ammonia, .9 parts caustic soda, 4.35 parts peroxid of hydrogen, 4.35 parts sodium nitrate, a stiffening material and water.

JOHN P. KELLY. [L. S.]
HAROLD F. REID. [L. S.]

Witnesses:
ANTON BOHM,
H. F. GOLMANN.

Copies of this patent may be obtained for five cents each, by addressing the "Commissioner of Patents, Washington, D. C."